(No Model.) 2 Sheets—Sheet 1.

R. I. HAMPTON.
ELECTRIC RAILWAY CONDUIT.

No. 514,827. Patented Feb. 13, 1894.

Witnesses.
Robert Everett
Thos. A. Green

Inventor:
Robert I. Hampton.
By James L. Norris.
Atty.

THE NATIONAL LITHOGRAPHING COMPANY,
WASHINGTON, D. C.

(No Model.)  2 Sheets—Sheet 2.

R. I. HAMPTON.
ELECTRIC RAILWAY CONDUIT.

No. 514,827. Patented Feb. 13, 1894.

Witnesses:
Robert Corriett,
Thos. A. Gurr

Inventor:
Robert I. Hampton,
By James L. Norris,
Atty.

THE NATIONAL LITHOGRAPHING COMPANY,
WASHINGTON, D. C.

UNITED STATES PATENT OFFICE.

ROBERT I. HAMPTON, OF ATHENS, GEORGIA.

ELECTRIC-RAILWAY CONDUIT

SPECIFICATION forming part of Letters Patent No. 514,827, dated February 13, 1894.

Application filed May 25, 1893. Serial No. 475,499. (No model.)

*To all whom it may concern:*

Be it known that I, ROBERT I. HAMPTON, a citizen of the United States, residing at Athens, in the county of Clarke and State of Georgia, have invented new and useful Improvements in Underground Conduits for Electric Railways, of which the following is a specification.

The object of this invention is to provide an improved electric conduit for the working conductors or trolley rails of electric railways and for telegraph, telephone and electric light wires or cables and other electric conductors.

My invention consists in the features of construction and novel combinations of parts in an underground electric conduit, as hereinafter described and claimed.

Figure 1:
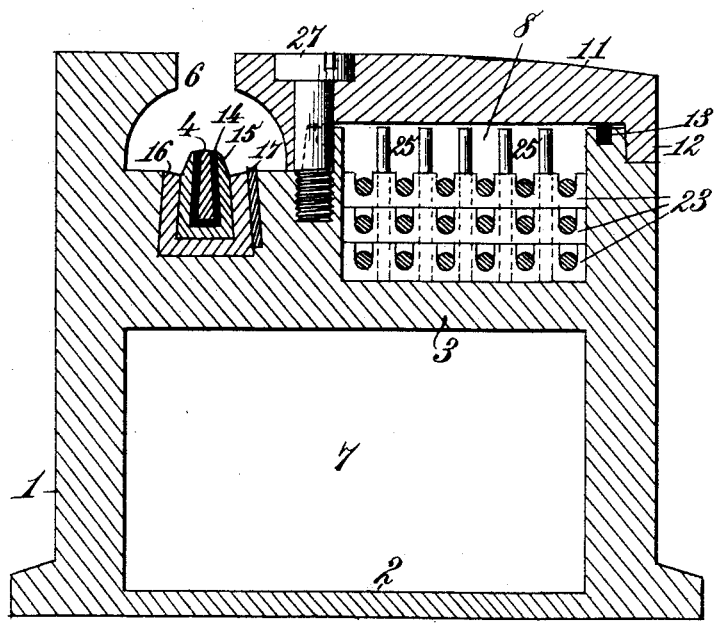
Figure 2:
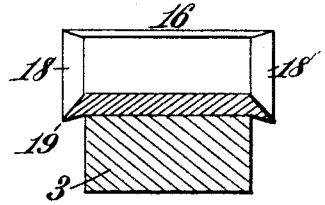
Figure 3:
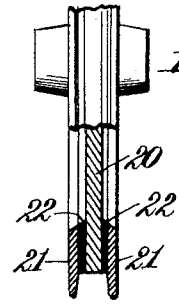
Figure 4:
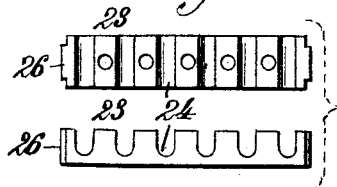
Figure 5:
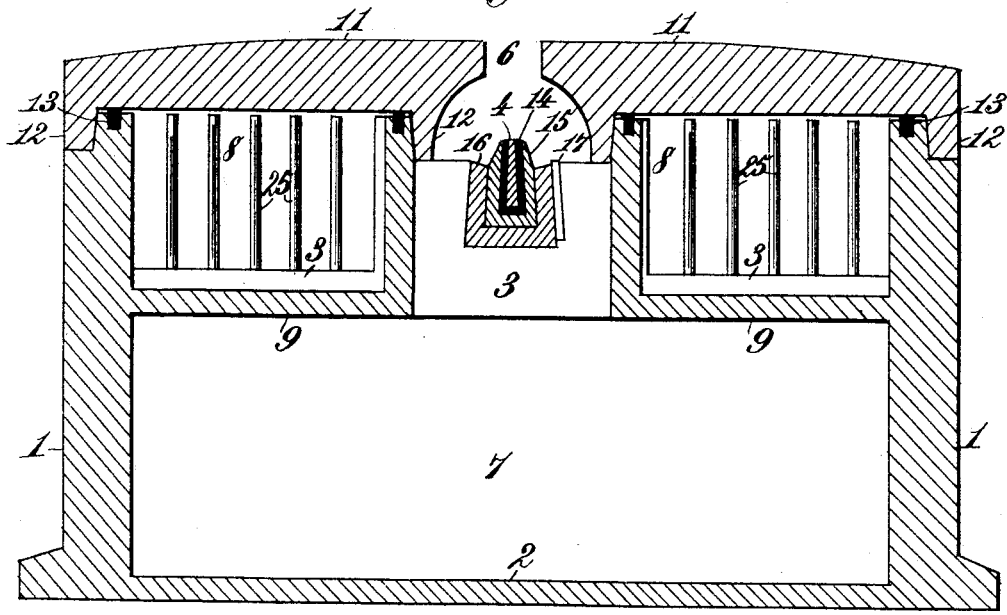
Figure 6:
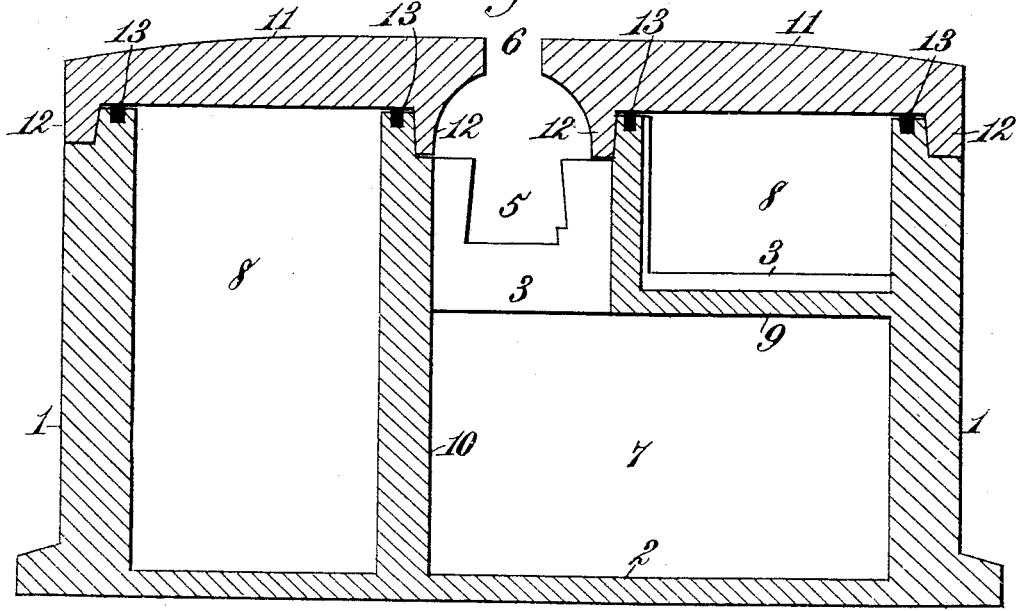

In the annexed drawings illustrating the invention—Figure 1 is a vertical transverse section of one form of my improved electric conduit showing in position an insulated trolley rail of an electric railway and also several electric cables or conductors resting in insulator supports or racks. Fig. 2 is a cross-section of one of the beams in the conduit and shows resting thereon one of the trolley rail insulators in central longitudinal section, the trolley rail and its inner insulation and armor being removed. Fig. 3 represents a section of a trolley wheel. Fig. 4 represents in plan and side elevation one of the insulator supports for a series of cables or conductors. Fig. 5 is a vertical transverse section of a modified form of electric conduit which is provided with a cable-way on each side of the trolley rail chamber or passage. Fig. 6 is a similar view of a conduit provided with two cable-ways and showing one of the cable-ways extended down to the bottom of the conduit.

The electric conduit is constructed with side walls 1 and bottom 2 of any suitable material and is provided at required intervals with transverse beams 3 arranged to support the trolley rail 4 and its insulating devices. The trolley rail chamber or passage 5 is provided at the top with a slot 6 for the trolley arm and at the bottom it communicates, between the beams 3, with a drain-way 7 located in the bottom or lower part of the conduit.

On one or both sides of the trolley rail chamber 5 is a cable-way 8 which, as shown in Fig. 5, is closed in wholly to itself by walls 9 that for the sake of economy may be of light construction between the transverse beams 3 which are arranged at such intervals as will give the required rigidity to the entire structure and afford adequate support for the trolley rail and for a large number of electric cables or conductors.

One of the cable-ways 8 may be extended down to the bottom of the conduit as shown in Fig. 6., thereby largely increasing the capacity of that cable-way while, at the same time, the vertical division wall 10, between the cable-way and drainway will materially strengthen the conduit and obviate any necessity for placing pillars beneath the cross-beams.

Each cable way 8 is provided with a removable close fitting cover or top 11 which may be extended to form one or both sides of the slot 6 in the top of the adjacent trolley rail chamber. The cover or covers 11 may be provided with lips or flanges 12 and packing strips 13 to more effectually exclude water, dirt or moisture from the cable-ways.

If desired, the conduit and cable-way covers may be cast in lengths of, say, ten or fifteen feet, more or less, and provided with socketed or flanged ends so as to be fitted together like water mains or sewer pipes.

That portion of each transverse beam 3 which is at the bottom of the trolley rail chamber or passage is grooved or recessed to receive the trolley rail and its insulators. The trolley rail or working conductor 4 is insulated, except on its upper or working edge, by some suitable non-conducting or insulating substance 14 which is preferably held in place by means of a metal armor or sheath 15 that is, in turn, insulated from the beam 3 by a hard rubber or other elastic insulator 16, the whole being firmly held by a wedge or key 17 in the recess of each supporting beam. This insulated and metal armored working conductor or trolley rail may be cut into sections of any desired length, insulated from each other, and the several sections connected by independent feed cables with a main supply cable through intermediate circuit controlling devices when the trolley rail is to be employed as part of the block system of an electric railway. The outermost insulator 16 is preferably provided with sloping or beveled edges 18 Fig. 2, terminating at its angles in lips 19, to collect and carry off condensed moisture, or water entering through the slot 6, and discharge it at the lips 19 to drop between the beams 3 into the drain-way; thereby obviating liability of short circuiting.

With this conduit and trolley rail it is preferable to employ a trolley wheel having flanges insulated from the wheel web 20 as shown in Fig. 3. The web portion 20 of the trolley wheel may be made of brass or other high conducting metal. The annular wheel flanges 21 may be made of steel and between these flanges and the webs 20 is placed insulating substance 22, as shown. The object of this construction is to prevent electrical connection between the conduit and the working conductor or trolley rail in case the flanges of the trolley wheel should strike the sides of the slot in rounding curves. There is sufficient clearance between the trolley rail 4 and walls of the trolley rail chamber or passage 5 to pass any object, like gravel, that might enter through the slot.

It will be observed that the cable-ways 8 are of sufficient capacity to accommodate a large number of cables, wires or working conductors for telegraph, telephone and electric light lines, &c., as well as for the main supply conductors or cables and branch feeders of an electric railway system. The various cables or conductors should, of course, be properly insulated from each other. In Figs. 1 and 4 are shown insulator racks or supports 23 of a length sufficient to extend across each cable-way. These racks 23 are constructed of suitable insulating material and are in the form of bars or strips that are each provided with a series of notches or curved recesses 24 on the upper surface to receive and hold apart the cables or conductors. The rack bars or insulators 23 may be vertically perforated between adjacent notches 24 so as to be readily placed or strung, one above the other on vertical pins or fingers 25, Fig. 1, that may be arranged at suitable intervals across the cable-way to hold said insulators or racks in position. Instead of employing the pins or fingers 25 the ends of the rack bars may be provided with tenons 26, Fig. 4., to drop into vertical grooves that may be formed at intervals in the side walls of the cable-way. By either of these means the rack bars will be held securely in place one above another so as to separate the severed layers of conductors or cables and also hold apart the cables or conductors in each layer. The several cables or conductors in the conduit will thus receive adequate support and be kept straight and distinct from each other so as to be readily identified at any point along the entire line.

The removable caps or covers 11 of the cable ways may be secured in place by means of screw-bolts 27, Fig. 1, at proper intervals and will afford ready access to the cables when necessary.

For the construction and maintenance of an electric conduit of the simple character described only a moderate outlay will be required.

What I claim as my invention is—

1. In an electric conduit, the combination of a trolley rail chamber having a slot in its top, a drain-way located below and communicating with the trolley rail chamber, transverse beams extended across the bottom of the trolley rail chamber and each provided with a groove or recess in its top, an insulated trolley rail supported in the grooves or recesses of said beams, and keys to hold the trolley rail firmly on said beams, substantially as described.

2. In an electric conduit, the combination of the trolley rail chamber 5, the drain-way 7 located below and communicating with the trolley rail chamber, the recessed or grooved beams 3 extended across the bottom of the trolley rail chamber, the trolley rail 4 provided with insulation 14, the metal armor or sheath 15, the beveled insulators 16 extended beyond the beams and provided with lips 19, and the keys 17 to secure the trolley rail and its insulators to the beams, substantially as described.

3. In an electric conduit, the combination of a trolley rail chamber, a drain-way located below and communicating with the trolley rail chamber, a cable-way located at the side of the trolley rail chamber and closed in from said chamber and from the drain-way, insulator and rack bars having their ends provided with tenons to drop into grooves in the sides of the cable-way, said rack-bars adapted to support and hold apart the cables or conductors, substantially as described.

4. An electric conduit provided with a trolley rail chamber, transverse beams to support the trolley rail and its insulating devices, a drain-way communicating with the trolley rail chambers between said beams, and a cable-way located at the side of the trolley rail chamber and closed in from said chamber and from the drain-way, substantially as described.

5. An electric conduit, consisting of a trolley rail chamber, transverse beams to support the trolley rail and its insulating devices, a drainway located below and communicating with the trolley rail chamber between said beams, and cable-ways located on opposite sides of the trolley rail chamber and closed in from said chamber and from the drain-way, substantially as described.

6. An electric conduit, consisting of a trolley rail chamber, transverse beams to support the trolley rail and its insulating devices, a drain-way communicating with the trolley rail chamber between said beams, and cable-ways located on opposite sides of the trolley rail chamber, one of said cable-ways being extended down to the bottom of the conduit, substantially as described.

7. An electric conduit, composed of a trolley rail chamber, a drain-way below the trolley rail chamber, and a cable-way located at the side of the trolley rail and provided with removable rack bars superimposed transversely in the cable-way to support and hold apart the cables, substantially as described.

In testimony whereof I have hereunto set my hand in presence of two subscribing witnesses.

ROBERT I. HAMPTON.

Witnesses:
G. A. MELL,
F. A. LIPSCOMB.